United States Patent [19]

Gruhn et al.

[11] 4,243,888

[45] Jan. 6, 1981

[54] LASER BEAM ALIGNMENT APPARATUS AND METHOD

[75] Inventors: Charles R. Gruhn, Martinez, Calif.; Robert B. Hammond, Los Alamos, N. Mex.

[73] Assignee: The United States of America as represented by the United States Department of Energy, Washington, D.C.

[21] Appl. No.: 37,982

[22] Filed: May 10, 1979

[51] Int. Cl.³ .................... G01N 21/00; G01N 23/00
[52] U.S. Cl. ................................ 250/491; 73/190EW
[58] Field of Search ............... 250/491, 385, 342, 370; 73/190 EW

[56] References Cited

U.S. PATENT DOCUMENTS

| 3,783,685 | 1/1974 | Zeiders et al. ................ 73/190 EW |
| 3,838,284 | 9/1974 | McIntyre et al. .................... 250/385 |
| 3,939,706 | 2/1976 | Pinson ............................. 73/190 EW |
| 4,019,381 | 4/1977 | Elmer ............................. 73/190 EW |
| 4,035,654 | 7/1977 | Elmer ................................... 250/491 |

Primary Examiner—Bruce C. Anderson
Attorney, Agent, or Firm—James E. Denny; Paul D. Gaetjens; Robert W. Weig

[57] ABSTRACT

The disclosure relates to an apparatus and method for laser beam alignment. Thermoelectric properties of a disc in a laser beam path are used to provide an indication of beam alignment and/or automatic laser alignment.

11 Claims, 3 Drawing Figures

LASER BEAM ALIGNMENT APPARATUS AND METHOD

FIELD OF THE INVENTION

The invention relates to systems for aligning laser beams and more particularly to an apparatus and method capable of aligning pulsed lasers utilizing pulsed heat diffusion in a detector having thermoelectric properties.

BACKGROUND OF THE INVENTION

Systems incorporating beam placement sensors to align laser beams are well known in the art. Most are usable only with continuous wave lasers although some are usable with pulsed lasers. Some are usable only once and are destroyed in use whereas others are reusable a number of times.

One particular system of interest is that disclosed in U.S. Pat. No. 4,035,654 to Elmer which shows a silicon disc device for use solely with continuous wave lasers, not being usable with a pulsed laser. Disposed on one side of the disc are a plurality of thermocouples which respond to variations in temperature on the disc when a beam is passed therethrough. The thermocouples connect to circuitry which provides an indication of beam misalignment, indicating a null when the beam is centered. The Elmer system has several intrinsic limitations as compared to the instant invention.

There is a need for a good beam alignment detector for high power pulsed lasers such as $CO_2$ lasers. One element that appears to be very desirable for such use and which is used in the preferred embodiment of the invention is silicon because it has very high damage threshold for wavelengths generated by $CO_2$ lasers. Too, very importantly, the thermoelectric effect in silicon is higher than for most other materials. Silicon is also very inexpensive and the art of manufacturing devices from the material is highly developed. The absorption of beam energy by the detector can be controlled by introducing selected amounts of impurities into the silicon which, because it has been utilized in electronic devices for a long period of time, has well known properties. Therefore, for many reasons, silicon appears to be an excellent material for use in practicing the invention. Another desirable property of silicon is that it can be manufactured to be transparent; thus it can be located in the beam path during actual laser operation with inconsequential effects on the power of the beam at a target. Alternatively, a silicon disc can be painted to be reflective, utilizing for example 10% of the beam energy for beam alignment and reflecting 90%. It can also be coated with an opaque coating and removably positioned in the beam path. One particularly good material for coating the silicon is lithium fluoride which is 100% absorbing and has an extremely high damage threshold for $CO_2$ laser radiation wavelengths.

It is important to note that the invention makes use of the pulsed heat diffusion properties of whatever material is selected for use as a detector. The material utilized in practicing the invention needs thermoelectric properties capable of generating a voltage from heat differences in the body of the device. The Elmer detector, although constructed of silicon, is utilized solely as a heat absorber, requiring thermocouples attached thereto. Electrical signals from Elmer's thermocouples, not electrical signals from the silicon itself, indicate temperature, the Elmer detector not utilizing the thermoelectric properties of silicon. This limits the time response of the Elmer detector and prevents its use in pulsed beam positioning. In Elmer's device, local thermal equilibrium must be established between the thermocouple heat detectors and the silicon disc. This could take as long as several seconds. In the instant invention the electrical signal follows the local silicon temperature in times of about $10^{-12}$ seconds making it ideal for pulsed beam positioning.

SUMMARY OF THE INVENTION

The invention is directed to an apparatus and method for laser beam alignment and more particularly to an apparatus and method utilizing a wafer or disc detector having thermoelectric properties. Electrical signals from the detector mirror thermal gradients and thus monitor thermal diffusion. The disc is positioned within the beam path in a preselected or known position. Contacts are attached to the disc at selected points on its surface to provide a means for outputting electric voltage differences within the material caused by heat differences in the material arising from the laser beam incident thereon. The electric voltage signals which are produced as a result of a beam impinging on the disc are integrated to determine the thermal diffusion occuring and are processed through appropriate circuitry to yield an indication of the laser beam's position on the disc. Further circuitry can be provided in order to automatically align the laser in response to the position of the laser beam on the disc.

One object of the present invention is to provide laser beam orientation determination utilizing the thermoelectric properties of a detection material.

A second object of the invention is to provide automatic laser positioning.

One advantage of the instant invention is that when compared to the prior art, structure and operation are simple.

Another advantage of the instant invention is that the structure thereof is inexpensive compared to prior art devices.

Another advantage is that the results of practicing the invention are more reliable and more accurate than those of the prior art.

BRIEF DESCRIPTION OF THE DRAWINGS

Other objects and advantages of the instant invention will be apparent to those skilled in the art from the following description with reference to the appended drawings wherein like numbers denote like parts and wherein.

DETAILED DESCRIPTION OF THE INVENTION

It is well known that single crystal semiconductors have been known to have large Seebeck coefficients, i.e., thermoelectric powers. Most semiconductors have room temperature Seebeck coefficients on the order of one millivolt per degree Kelvin (mV/k) while metals have much lower coefficients, on the order of 10 microvolts/degree Kelvin ($\mu V/k$). In particular, silicon is a widely utilized, inexpensive semiconductor material having very high thermoelectric power and a very high optical damage threshold, i.e., on the order of $>10^9$ watts per square centimeter (w/cm$^2$) at 10.6 microns ($\mu$m).

Figure 1:
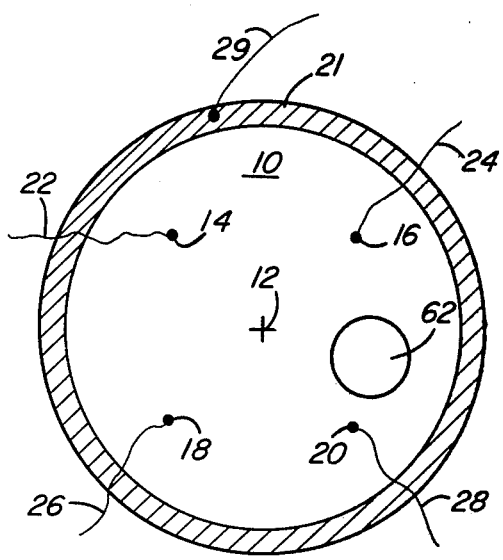
FIG. 1 illustrates a detector in accordance with the invention.

In a preferred embodiment of the invention, the detector may be a single crystal silicon wafer having a signal output which is linear in deposited energy, linear in position, and shows a null or zero signal when a beam is positioned on its center. Such a detector might appear as that in FIG. 1, being a disc 10 having a center 12 and ohmic contacts 14, 16, 18, 20 and 21 to which leads 22, 24, 26, 28, and 29 are attached, respectively. The contacts may comprise aluminum and the leads copper. The detector of the invention should not be confused with current-division type position sensors which may have similar structure. A current-division sensor depends for its operation on the production of nonequilibrium charge carriers. Silicon requires excitation radiation with wavelengths less than about 1.12 $\mu$m to excite free electron-hole pairs. Significantly, the thermopower position sensor of the invention requires no free carrier production, but depends for its operation on electric fields produced by the redistribution of free carriers resulting from temperature gradients in the detector material.

In a preferred embodiment the disc is a 3 inches in diameter single crystal silicon wafer, 380 $\mu$m thick with both sides polished and etched. The wafer is p-type with a resistivity of 16 ohm-centimeters ($\Omega$cm). Circular aluminum contacts 14, 16, 18 and 20, 2.25 centimeters (cm) from detector center 12, symetrically placed, and 0.5 cm in diameter are formed on the etched surface of the wafer. A reference aluminum contact 21 0.5 cm wide is disposed on the periphery of the wafer. The wafer is mounted in an aluminum plate having a 2 ½ inch aperture. The wafer is centered in the plate aperture and attached to the plate at four places on the edge of the wafer with an insulating epoxy. Either side of the wafer is illuminated with the laser.

Figure 2:
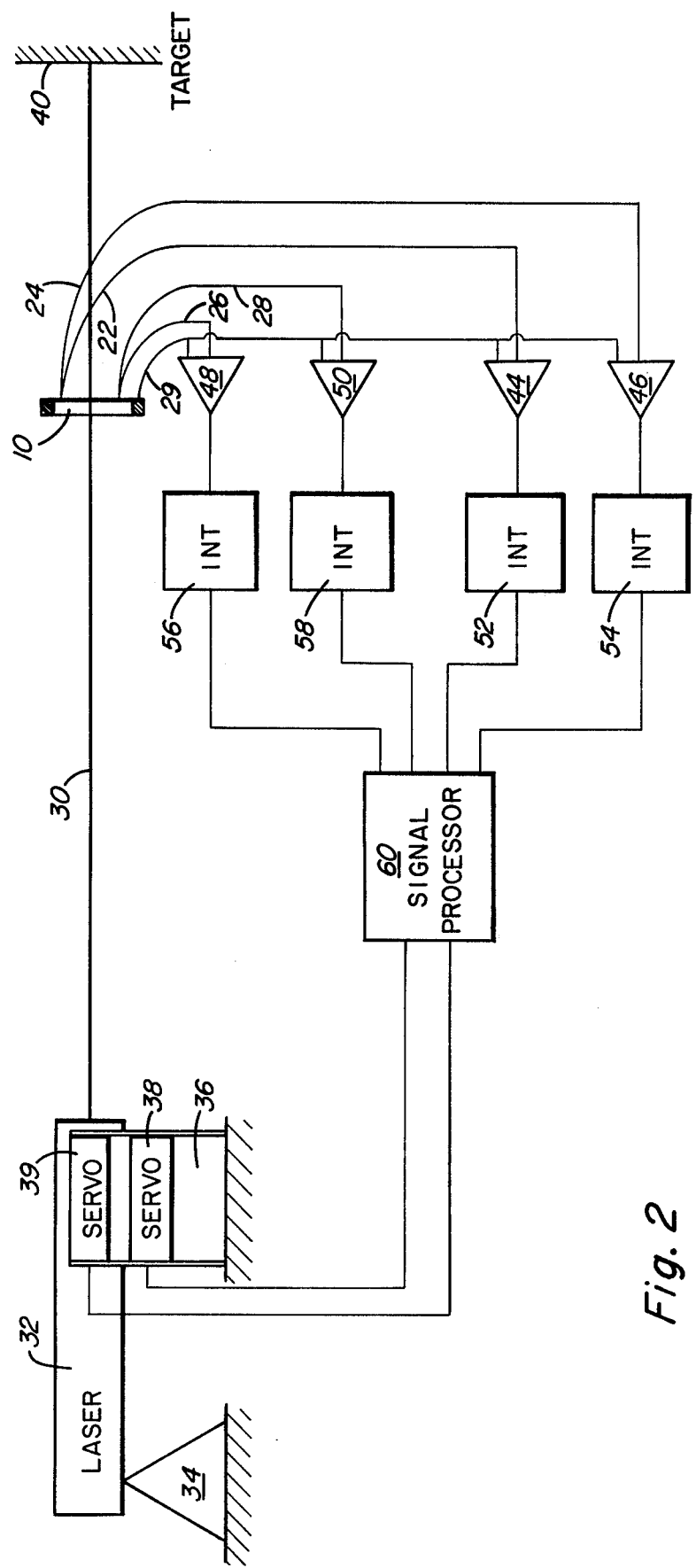
FIG. 2 is a general block diagram of a system incorporating the preferred embodiment of the invention.

As seen in FIG. 2, the wafer or disc detector 10 is impinged upon by a beam 30 from a laser 32 mounted on mounts 34 and 36. The laser is alignable by servos 38 and 40 on mount 36. A target 40 is disposed on the other side of the detector 10. In this particular embodiment the silicon wafer may be transparent, or opaque and removable.

Figure 3:
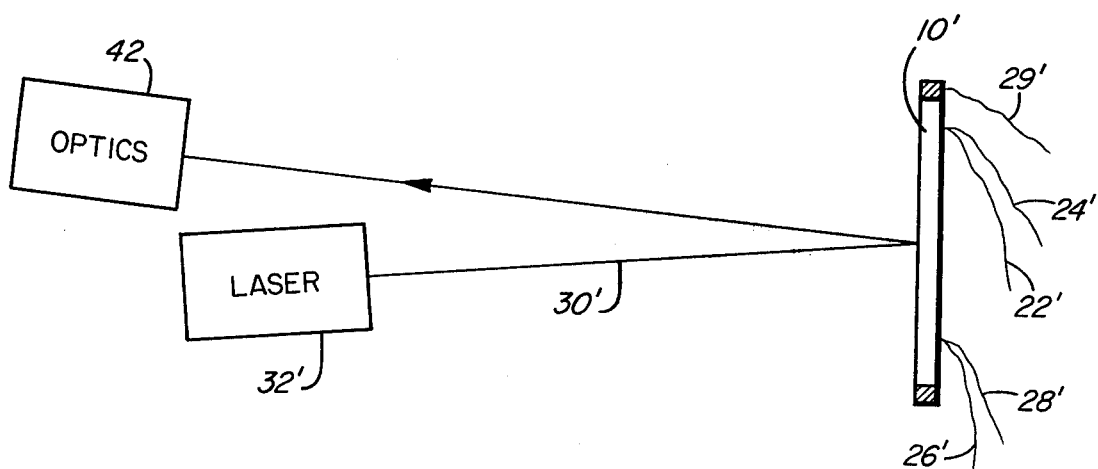
FIG. 3 shows a detector in accordance with the invention in a reflective mode.

FIG. 3 shows an alternative embodiment wherein a laser 32' produces a beam 30' which is reflected from a detector 10' having leads 22', 24', 26', 28' and 29'. Detector 10' can be functionally used to direct laser light as needed to, for example, optics 42.

The output of detector 10 when impinged upon by a laser pulse is in the form of a voltage generated by themoelectric properties and pulsed heat diffusion within the material, which causes voltage differences across temperature gradients within the material. The resulting signals are passed through amplifiers 44, 46, 48 and 50, the outputs of which are integrated by integrators 52, 54, 56 and 58. The integrators are connected to a signal processor which can provide an output indicative of the position of the beam or provide outputs to servos 38 and 39 which will realign or fine tune the alignment of laser 32. Such servo control signal processors are well-known to those skilled in the art, and may comprise devices similar to those shown in U.S. Pat. No. 3,838,284 to McIntyre et al. Thus, if the laser pulse were to appear on the detector of FIG. 1 at position 62, an electrical output would be produced in the circuitry of FIG. 2 which would align the beam to center 12 of disc 10.

The detector should have a large radius compared to the radius of the beam for high accuracy. For sensing a wide range of wavelengths silicon can be coated with a thin absorbing material such as LiF or Nextel 101-C10 black paint. It is also notable that if the silicon detector is cooled, thermopower increases as great as three orders of magnitude may be obtained. Generally, the thinner the detector the greater its sensitivity. Therefore, if both sides of the detector are optically polished and antireflection coated, some fraction of the beam can be absorbed to allow position determination and the remaining fraction allowed to pass through undisturbed except for a small phase shift.

Although one advantage of the detector is that it may be used with pulsed beams, it can also be utilized in continuous wave applications.

The various features and advantages of the invention are thought to be clear from the foregoing description. However, various other features and advantages not specifically enumerated will undoubtedly occur to those versed in the art, as likewise will many variations and modifications of the embodiments illustrated, all of which may be achieved without departing from the spirit and scope of the invention as defined by the following claims.

What is claimed is:

1. A method for determining the alignment of a laser beam comprising the steps of:
   intercepting the beam with a planar material substantially incident perpendicular thereto, said material having thermoelectric properties and a known placement relative to the laser, the material having a plurality of ohmic electrical contacts disposed on a surface thereof at selected locations, the contacts being operably connected to electrical conductors, the beam producing thermoelectric effects from pulsed heat diffusion in the material;
   carrying voltage signals representative of the thermoelectric effects in the material through the conductors within no more than about 100 milliseconds;
   integrating the thermoelectric voltage signals over a selected period of time; and
   processing the integrated voltage signals to provide an output representative of the beam's position on the surface of the material.

2. The invention of claim 1 wherein the integration time is between about 8 and about 12 seconds.

3. The invention of claim 1 further comprising the step of automatically aligning the laser to a predesired position in response to the output.

4. An apparatus for determining the alignment of a laser comprising:
   a detector disc having thermoelectric properties yielding voltage signals from pulsed heat diffusion, said disc being disposed in the beam path of said laser at a preselected position;
   means for conducting said voltage signals generated by thermal gradients in said material caused by said laser beam from selected points on said disc to signal integrators within no more than about 100 milliseconds; and means for processing said integrated voltage signals to provide indication of the position of said beam on said disc.

5. The invention of claim 4 further comprising means for automatically aligning said laser to a desired position in response to said positional indication.

6. The invention of claim 4 wherein said detector disc is essentially transparent and said laser pulse effectively passes therethrough substantially unaffected thereby.

7. The invention of claim 4 wherein said detector disc is reflective.

8. The invention of claim 4 wherein said disc is opaque and removable from said beam path.

9. The invention of claim 4 wherein said detector disc comprises silicon.

10. The invention of claim 9 wherein said silicon detector disc is coated with lithium fluoride.

11. The invention of claim 4 wherein said voltage signals follow local disc temperature in as few as about $10^{-12}$ seconds.

* * * * *